United States Patent [19]

Arima et al.

[11] Patent Number: 5,420,949
[45] Date of Patent: May 30, 1995

[54] POLARIZATION-SPLITTING FIBER COUPLER AND METHOD OF MAKING SAME

[75] Inventors: Tadao Arima; Koji Okamura, both of Kawasaki, Japan

[73] Assignee: Fujitsu Limited, Kawasaki, Japan

[21] Appl. No.: 101,061

[22] Filed: Aug. 3, 1993

[30] Foreign Application Priority Data

Aug. 11, 1992 [JP] Japan .................. 4-214119

[51] Int. Cl.⁶ .................. G02B 6/10; C03B 23/20
[52] U.S. Cl. .................. 385/43; 385/11; 385/42; 385/50; 385/96; 65/411; 65/435
[58] Field of Search .................. 385/11, 42, 43, 46, 385/50, 51, 94, 95; 65/1, 2, 4.1, 4.2, 12

[56] References Cited

U.S. PATENT DOCUMENTS

| | | | |
|---|---|---|---|
| 4,531,811 | 7/1985 | Hicks, Jr. .................. | 385/11 X |
| 4,632,513 | 12/1986 | Stowe et al. .................. | 385/11 X |
| 4,756,589 | 7/1988 | Bricheno .................. | 385/11 X |
| 4,772,085 | 9/1988 | Moore et al. .................. | 385/43 X |
| 4,801,185 | 1/1989 | Bricheno .................. | 385/43 X |
| 4,906,068 | 3/1990 | Olson et al. .................. | 385/43 X |
| 4,997,248 | 3/1991 | Stowe .................. | 385/43 X |
| 5,069,518 | 12/1991 | Sasaki et al. .................. | 385/43 |
| 5,255,335 | 10/1993 | Sasaki et al. .................. | 385/43 |
| 5,283,847 | 2/1994 | Sasaoka et al. .................. | 385/43 |
| 5,293,440 | 3/1994 | Miles et al. .................. | 385/11 X |

*Primary Examiner*—Brian Healy
*Attorney, Agent, or Firm*—Armstrong, Westerman, Hattori, McLeland & Naughton

[57] ABSTRACT

Disclosed is a polarization-splitting fiber coupler capable of stably executing a polarization separation/coupling and a method of stably manufacturing the polarization-splitting fiber coupler at a low cost. The method comprises the steps of (1) arranging a plurality of non-polarization fibers in parallel so that the side surfaces thereof come into contact to each other; (2) heating and fusing a portion of the arranged non-polarization fibers by controlling a heating temperature and a heating time so that the cross section of the fused portion thereof has an aspect ratio of 1.85–1.95; (3) thereafter, forming a fused/drawn portion by drawing the fused portion while keeping the aspect ratio after lowering the heating temperature; and (4) connecting polarization-maintaining fibers to the respective ends of the fused/drawn portion, respectively. Further, a portion of the connected polarization-maintaining fiber is heated and drawn to a taper-shape to provide the heated-fused portion with a polarizer function.

6 Claims, 6 Drawing Sheets

POLARIZATION-SPLITTING FIBER COUPLER AND METHOD OF MAKING SAME

BACKGROUND OF THE INVENTION

1. Field of the Invention

The present invention relates to a polarization-splitting coupler used for an optical communication and optical transmission and a method of manufacturing the same, and more specifically, to a polarization-splitting fiber coupler having a polarized light coupling portion formed by heating, fusing and drawing a plurality of optical fibers.

2. Description of the Related Art

A polarization-splitting fiber coupler made by fusing fibers is widely used because it has such an advantage as a less amount of inserting loss, low manufacturing cost and the like. In particular, since the polarization-splitting fiber coupler has a polarization-keeping characteristics, it is used for the coherent optical transmission and the like of an optical multiplex transmission.

Figure 1A:
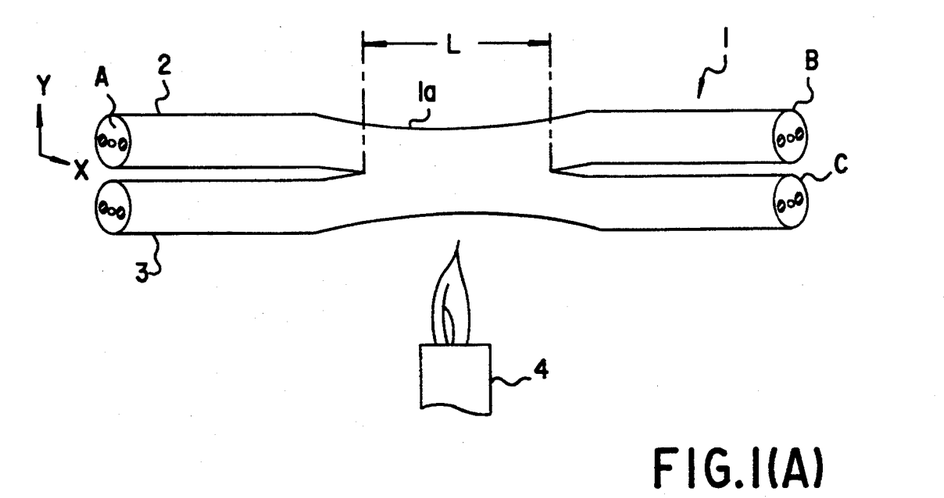
FIG. 1(A) is a diagram explaining a method of manufacturing a conventional polarization-splitting fiber coupler.

Conventionally, two methods are available to make a polarization-splitting fiber coupler: in a first method, two non-polarization fibers are arranged and a portion thereof is heated, fused and drawn in the axial direction thereof while optimizing an aspect ratio; and in a second method, two polarization-maintaining fibers 2, 3 are arranged after having been adjusted by axially rotation so that the planes of polarization thereof face to the same direction and a portion thereof is heated and fused by an oxyhydrogen burner 4 to draw the fibers 2, 3 in the axial direction thereof so as to form a fused/drawn portion 1a for the manufacture of a polarization-splitting fiber coupler 1, as shown in FIG. 1(A).

In the above fused/drawn portion 1a, it is found that the state that a clad can be regarded as a core is achieved as a result that a new coupling mode is made by an evanescent light leaked from the core, whereas polarization separation/coupling characteristics greatly depend upon the diameter and configuration of the clad. More specifically, it is contemplated that a mode phase difference is produced between the X-polarized light and Y-polarized light of the clad portion of the fused/drawn portion 1a and the mode phase difference is greater than the mode phase difference therebetween produced by the portion of the polarization-maintaining fibers. Further, since the mode phase difference is different depending upon the wavelength of a light, the polarization separation/coupling characteristics of the polarization-splitting fiber coupler has a wavelength-depending property.

Incidentally, in the first method, although the non-polarization fibers must be heated and fused while optimizing the aspect ratio, the optimization of the aspect ratio depends upon the perception and experience of a manufacturer and thus the aspect ratio is not always stably kept to an optimum value. Under such a circumstance, the conventional polarization-splitting fiber coupler is drawn and made so that a phase difference between an X-polarization light and a Y-poralization light is $\pi/2$ and thus the fused/drawn portion thereof must be heated and drawn up to 20 cycle days. More specifically, generally speaking when the fused/drawn portion is heated and drawn, the degree of polarization separation thereof is cyclically changed, it must be continuously heated and drawn until the degree of polarization separation of 100% arises 20 times. As a result, the fused/drawn portion has a considerably increased length L. When the length L of the fused/drawn portion is increased, the polarization state of the fused/drawn portion is liable to be unstable and thus polarization separation/coupling cannot be stably executed.

Further, the polarization-splitting fiber coupler made by the first method has a problem in that since the fibers does not have a polarization keeping function by themselves, the polarization state thereof is made unstable before a polarized light reaches the fused/drawn portion and thus the polarization separation/coupling cannot be stably executed, in addition to that the optimization of the aspect ratio is difficult.

Figure 1B:
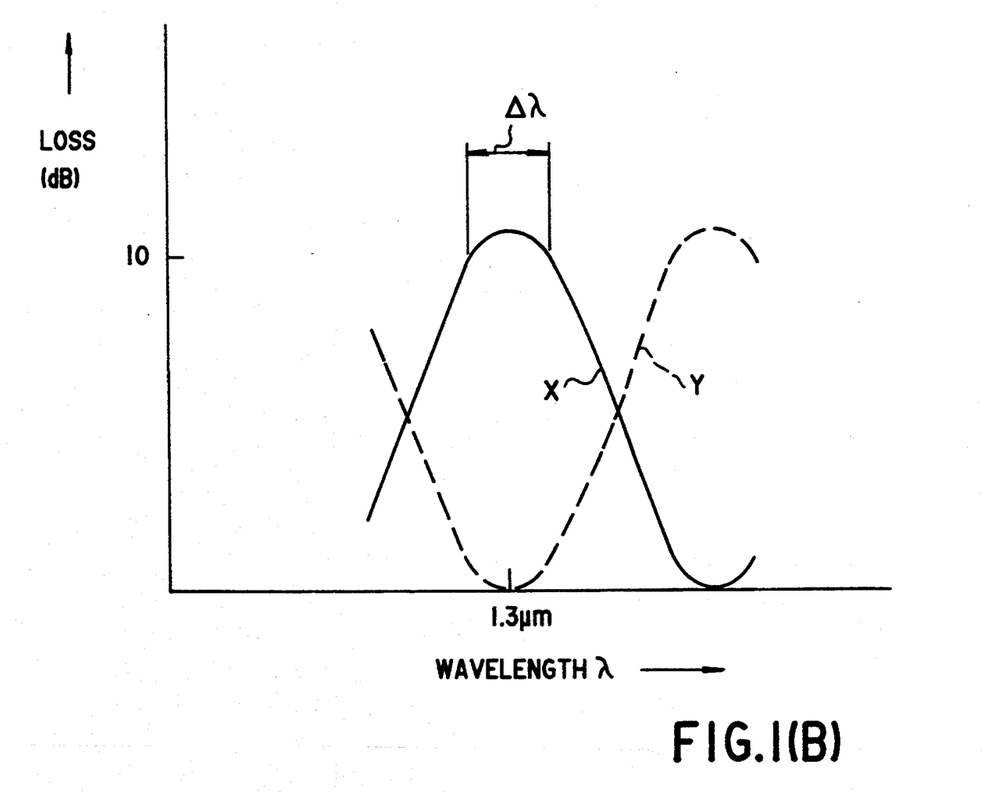
FIG. 1(B) is a graph showing the wavelength characteristics of the conventional polarization-splitting fiber coupler.

On the other hand, FIG. 1(B) shows the wavelength characteristics of the conventional polarization-splitting fiber coupler 1 made by the second method, wherein the ordinate shows a loss of the X- and Y-polarized lights at the light emitting end C of the polarization-maintaining fiber 3 and the abscissa shows a wavelength of a light in the case that the X-, Y-polarized lights are incident from the incident end A of the polarization-maintaining fiber 2 and the X-polarized light is taken out from the light emitting end B of the polarization-maintaining fiber 2 and the Y-polarized light is taken out from the light emitting end C of the polarization-maintaining fiber 3. In this conventional polarization-splitting fiber coupler 1, a wavelength region $\Delta\lambda$ where a degree of separation between the X-polarized light and the Y-polarized light exceeds 10 dB is about 30 nm.

Further, since the conventional polarization-splitting fiber coupler 1 is composed of the polarization-maintaining fibers 2, 3 having a short length of 1-2 m, it has a weak polarization selection property and thus the X-, Y-polarized lights each having a slightly shifted plane of polarization reach the fused/drawn portion 1a so that a sufficient degree of polarization separation/coupling cannot be obtained. That is, a degree of polarization separation in the conventional polarization-splitting fiber coupler 1 is about 13 dB at best. Further, an inserting loss may be increased or a degree of polarization separation may lowered due to the shift of the planes of polarization of the polarization-maintaining fibers 2, 3 and the polarization-maintaining fiber (not shown) of a transmitting portion connected thereto at the junction where they are connected to each other.

SUMMARY OF THE INVENTION

An object of the present invention is to provide a polarization-splitting fiber coupler capable of stably executing a polarization separation/coupling and having a wide wavelength in which the polarization separation/coupling can be executed and a high degree of polarization separation and a method of stably manufacturing the polarization-splitting fiber coupler.

To achieve the above object, the present invention provides a method of manufacturing the polarization-splitting fiber coupler, which comprises the steps of (1) arranging a plurality of non-polarization fibers in parallel so that the side surfaces thereof come into contact to each other; (2) heating and fusing a portion of the arranged non-polarization fibers by controlling a heating temperature and a heating time so that the cross section of the fused portion thereof has an aspect ratio of 1.85-1.95; (3) thereafter, forming a fused/drawn portion by drawing the fused portion while keeping the aspect ratio after lowering the heating temperature; and (4) connecting polarization-maintaining fibers to the respective ends of the fused/drawn portion, respectively.

Further, the present invention provides a method of manufacturing the polarization splitting coupler, which comprises the steps of (1) connecting polarization-maintaining fibers to the respective ends of a plurality of non-polarization fibers; (2) arranging the non-polarization fibers of the plurality of thus obtained fibers in parallel so that the side surfaces thereof come into contact to each other; (3) heating and fusing a portion of the arranged non-polarization fibers by controlling a heating temperature and time so that the cross section of the fused portion thereof has an aspect ratio of 1.85–1.95; and (4) thereafter, forming a fused/drawn portion by drawing the fused portion while keeping the aspect ratio after lowering the heating temperature.

Further, there is provided a polarization-splitting fiber coupler, which comprises a plurality of polarization-maintaining fibers arranged in parallel so that the side surfaces thereof come into contact to each other, the polarization-maintaining fibers having a portion heated and fused by controlling a heating temperature and time so that the cross section of the fused portion has an aspect ratio of 1.85–1.95 and thereafter drawn in the axial direction thereof while keeping the aspect ratio after lowering the heating temperature and formed to a fused/drawn portion; and a plurality of polarization-maintaining fibers connected to the respective ends of the plurality of the non-polarization fibers, respectively.

The above and other objects, features and advantages of the present invention will be become apparent from the following description when taken in conjunction with the accompanying drawing which illustrate preferred embodiments of the present invention by way of example.

DESCRIPTION OF THE PREFERRED EMBODIMENTS

First, the outline of an embodiment of the present invention will be described.

Figure 2A:
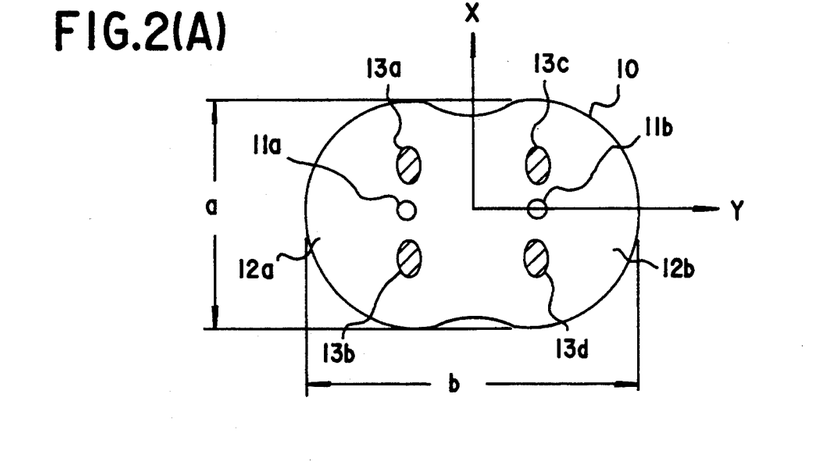
FIG. 2(A) is a cross sectional view of the fused/drawn portion of a polarization-splitting fiber coupler of an embodiment.
Figure 2B:
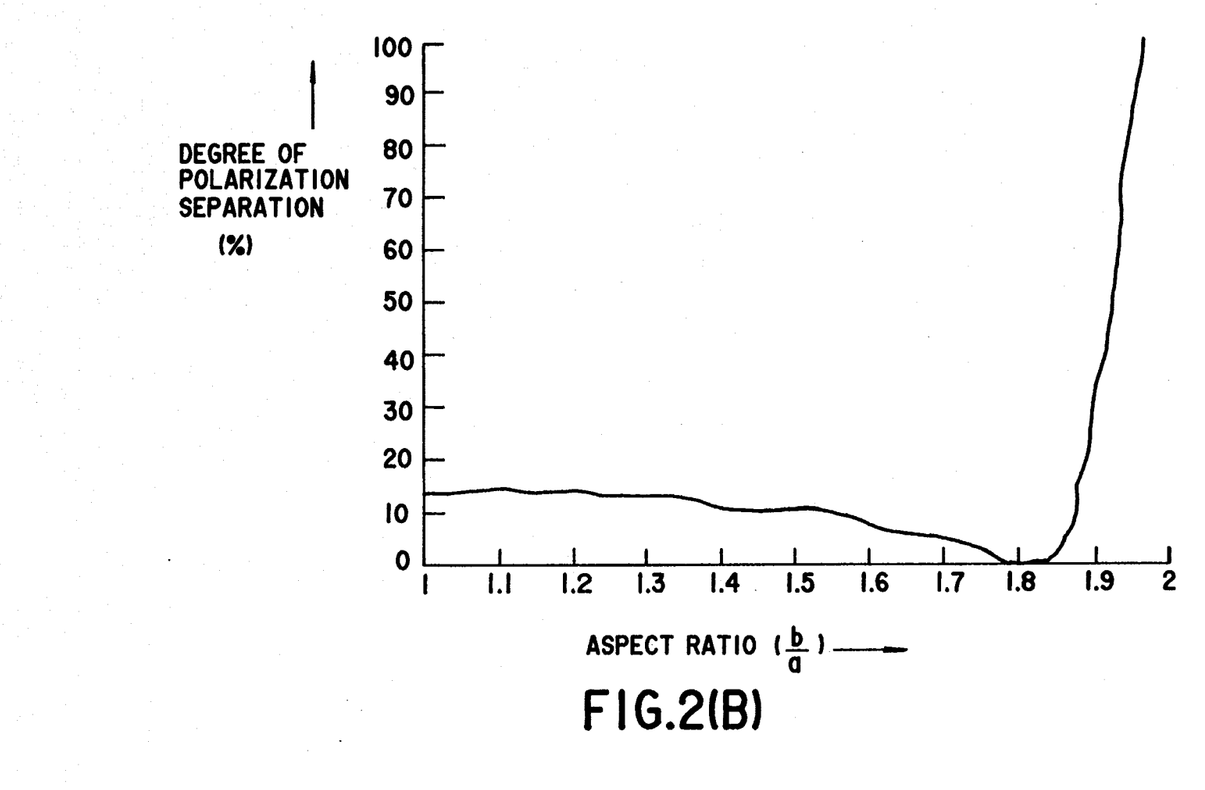
FIG. 2(B) is a graph showing the relationship between the aspect ratio and the degree of polarization separation of the fused/drawn portion.

FIG. 2(A) is a cross sectional view of the fused/drawn portion of a polarization-splitting fiber coupler of the embodiment and FIG. 2(B) is a graph showing the relationship between the aspect ratio and the degree of polarization separation of the fused/drawn portion, In FIG. 2(A), the fused/drawn portion 10 of the polarization-splitting fiber coupler is composed of the cores 11a, 11b, clads 12a, 12b and stress applying parts 13a, 13b, 13c, 13d which have originally constituted two polarization-maintaining fibers. When it is assumed here that the longitudinal diameter of the fused/drawn portion 10 is designated by a and the horizontal diameter thereof is designated by b, an aspect ratio is defined by b/a.

In the embodiment of the present invention, a phase difference between X-, Y-polarized lights is increased by optimizing the aspect ratio and the phase difference between the X-, Y-polarized lights is increased by reducing the diameter of the polarization-maintaining fibers. Therefore, a sufficient phase difference can be obtained even if the fused/drawn portion (coupling portion) has a short length in the axial direction thereof and a polarization-splitting fiber coupler having a high degree of polarization separation/coupling is expected to be obtained in a wide wavelength region. Further, when the aspect ratio is optimized in fusing and drawing, the same effect can be expected even with respect to a polarization-splitting fiber coupler formed of non-polarization fibers.

Thus, the relationship between the aspect ratio and the degree of polarization separation of the many manufactured samples of polarization-splitting fiber couplers by which a high degree of polarization separation was obtained with a relatively short fused/drawn length L was examined, by paying attention to the aspect ratio b/a. As a result, the graph of a degree of polarization separation as shown in FIG. 2(B) was obtained. According to this graph, an optimum aspect ratio at which the degree of polarization separation is increased exists in the range from 1.85 to 1.95. Note, when the aspect ratio is greater than 1.95, fusing is unstable and thus such an aspect ratio cannot be practically used.

Next, three embodiments of the present invention will be specifically explained.

FIGS. 3(A)–(F) are diagrams explaining a method of manufacturing a polarization-splitting fiber coupler of a first embodiment.

In FIGS. 3(A)–(F), a polarization-maintaining fiber 21 is composed of, for example, a PANDA fiber (polarization-maintaining and absorption-reduced fiber) and is preheated at the portion 21a of the light emitting side thereof by an oxyhydrogen burner 23 so that the portion 21a is drawn to a taper-shape. Since the polarization-maintaining fiber 21 has a different transmission constant $\beta$ with respect to an X-polarized light and Y-polarized light, when the portion 21a is heated and drawn to the taper-shape, it is provided with the function of a so-called polarizer by which only the polarization component of any one of the X-, Y-polarized lights can be passed therethrough.

A polarization-maintaining fiber 22 arranged in parallel with the polarization-maintaining fiber 21 is also processed in the same way so that a portion 22a thereof is also provided with the function of a polarizer. Thus, a polarization selecting property can be provided with each of the polarization-maintaining fibers 21, 22. Note, although a predetermined polarization selecting property is provided with the respective polarization fibers 21, 22 constituting the polarization-splitting fiber coupler in accordance with the various applications of the polarization-splitting fiber coupler, the polarization-maintaining fiber 21 is provided with a Y-polarization selecting property and the polarization-maintaining fiber 22 is provided with an X-polarization selecting property.

Figures 3A, 3B, 3C:
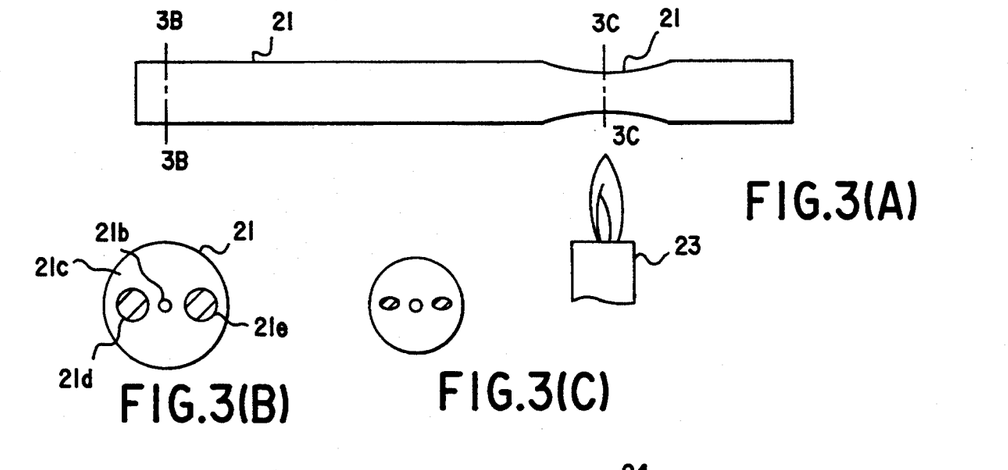
FIGS. 3(A)–(C) are diagrams explaining a method of forming a polarizer in the polarization-splitting fiber coupler of the first embodiment.

Next, in FIG. 3(B), the polarization-maintaining fibers 21, 22 are adjusted by being rotated about the axes thereof so that the X-, Y-planes of polarization of the polarization-maintaining fibers 21, 22 face to the same direction and then the polarization-maintaining fibers 21, 22 are arranged so that they come into contact to each other on the side surfaces thereof, and next the polarization-maintaining fibers 21, 22 are partially heated by the oxyhydrogen burner 23 from the side surfaces thereof to form a fused portion 24a. Note, in the figure, numeral 21b designates the core of the polarization-maintaining fiber 21, numeral 21c designates the clad thereof, numerals 21d, 21e designate the stress applying parts thereof, and numeral 12b designates the core of the polarization-maintaining fiber 22, numeral 22c designates the clad thereof and numerals 22d, 22e designate the stress applying parts thereof.

In this heating operation, a heating temperature and time are controlled so that the aspect ratio b/a of the cross section of the fused portion 24a is 1.85–1.95. More specifically, the heating operation may be controlled by monitoring the aspect ratio at a real time by a microscope, an image processing device or the like. To reduce a manufacturing cost, however, it is preferable that an amount of a gas to be supplied by the oxyhydrogen burner 23 and a heating time, by which the aspect ratio of 1.85 to 1.95 can be obtained are determined by previously executing an experiment and the heating temperature and time are controlled in accordance with thus obtained experimental values. For example, it has been confirmed with respect to the oxyhydrogen burner 23 that when an oxygen gas of 0.5 liter is supplied together with a hydrogen gas of 2 liters, the aspect ratio of about 1.95 is obtained by setting the heating time to about 10 seconds.

When drawing is executed at a low temperature, the aspect ratio is not changed, and thus thereafter the heating temperature is lowered to keep the aspect ratio constant and the polarization fibers 21, 22 are drawn in the axial direction thereof with respect to the fused portion 24a.

Figure 3D:
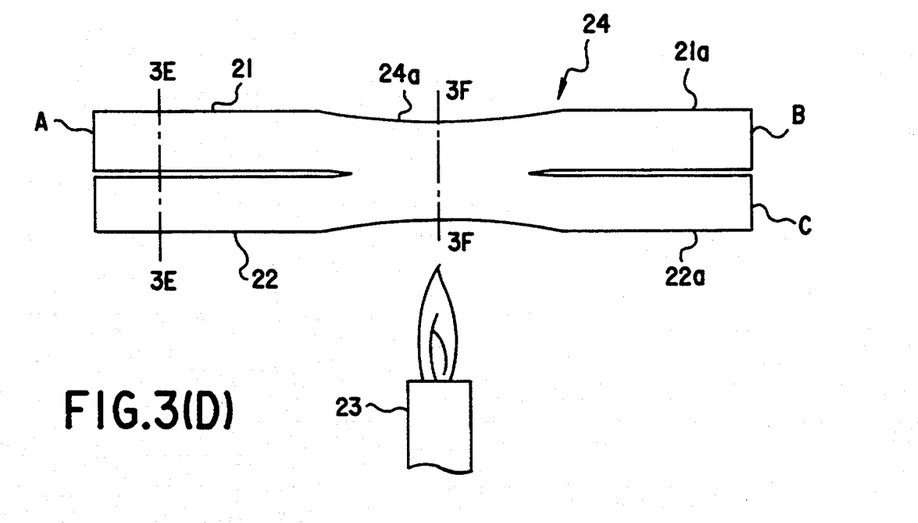
FIGS. 3(D)–(F) are diagrams explaining a method of manufacturing the polarization-splitting fiber coupler of the first embodiment.
Figure 3E:
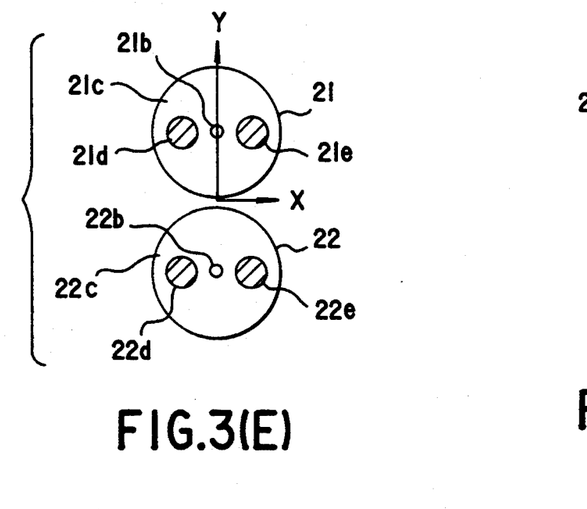
Figure 3F:
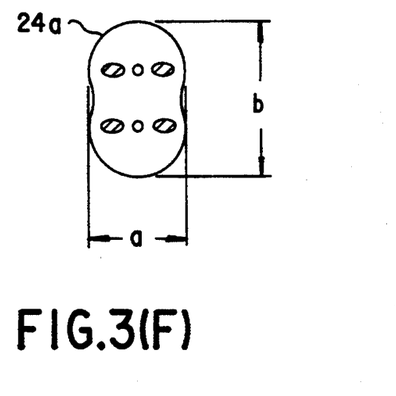

At this time, the X-polarized light of an optical power $P_0$ and the Y-polarized light of the optical power $P_0$ are input from, for example, the light incident end A of the polarization-maintaining fiber 21, the optical power $P_2$ of the X-polarized light is monitored at the light emitting end C of the polarization-maintaining fiber 22 and the optical power $P_1$ of the Y-polarized Light is monitored at the light emitting end B of the polarization-maintaining fiber 21. Then, the heating and drawing operation is stopped when both a degree of coupling $P_2/P_0$ and a degree of coupling $P_1/P_0$ reach 100% at the respective light emitting ends. Thus, the fused/drawn portion 24a functions as the separator/coupler of the X-, Y-polarized lights and constitutes the polarization-splitting fiber coupler 24 together with the portions 21a, 22a serving as the polarizer.

Note, the portions 21a, 22a serving as the polarizer may be created after the formation of the fused/drawn portion 24a.

Figure 4:
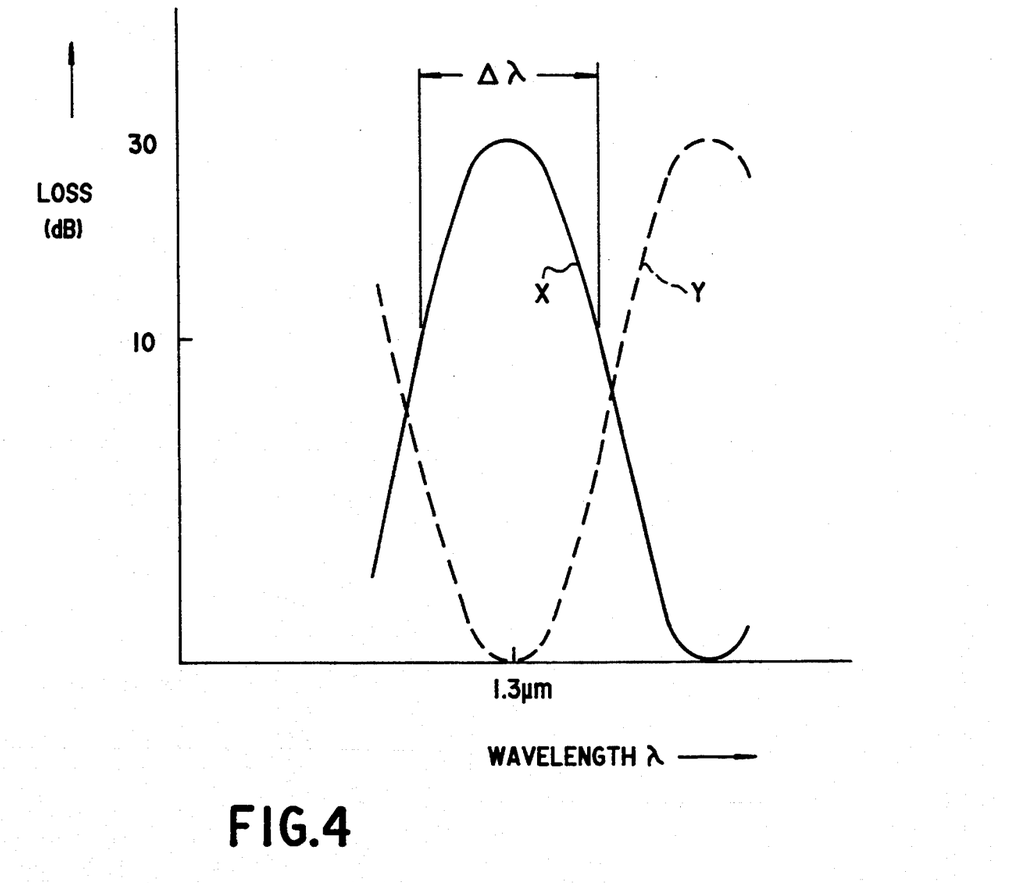
FIG. 4 is a graph showing the wavelength characteristics of the polarization-splitting fiber coupler of the first embodiment.

FIG. 4 is diagram showing the wavelength characteristics of the polarization-splitting fiber coupler of the first embodiment.

More specifically, the waveform region $\Delta\lambda$ where a degree of polarization separation between the X-, Y-polarized lights is 10 dB or more is 80 nm which is very wider than the conventional one of 30 nm. Further, a degree of polarization separation at a central waveform (e.g., 1.3 $\mu$m) is 30 dB or more which is by far the higher than the conventional one of 13 dB. Further, the polarization-splitting fiber coupler 24 made by the above method has an inserting loss of 0.4 dB or lower.

FIGS. 5(A)–(G) are diagrams explaining a method of manufacturing a polarization-splitting fiber coupler of a second embodiment.

Figures 5A, 5B, 5C:
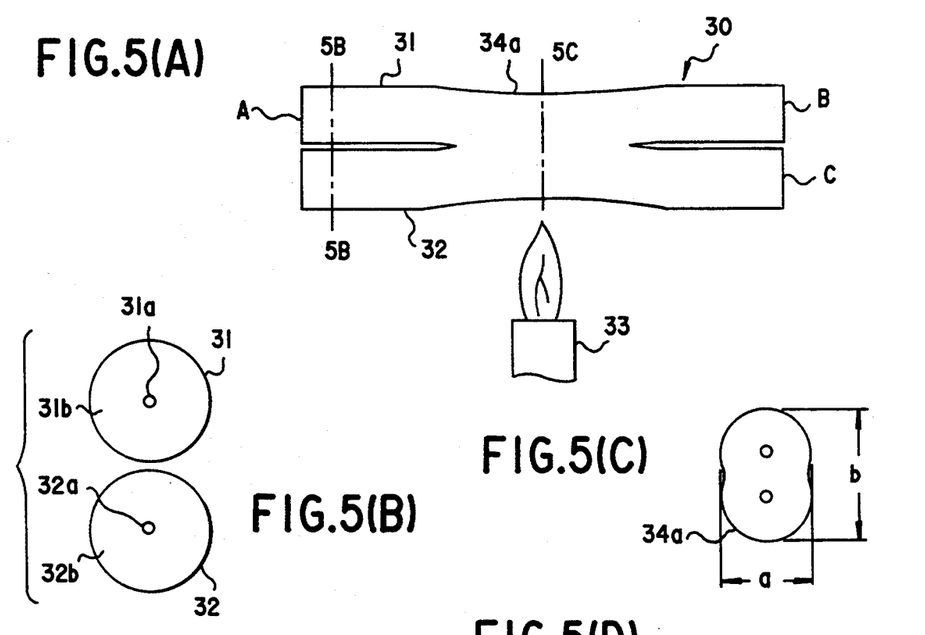
FIGS. 5(A)–(C) are diagrams explaining the fusing in a method of manufacturing a polarization-splitting fiber coupler of a second embodiment.
Figure 5D:
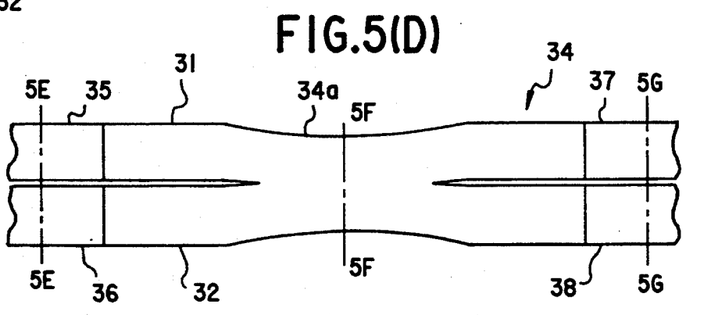
FIGS. 5(D)–(G) are diagrams explaining the drawing in the method of manufacturing the polarization-splitting fiber coupler of the second embodiment.
Figure 5E:
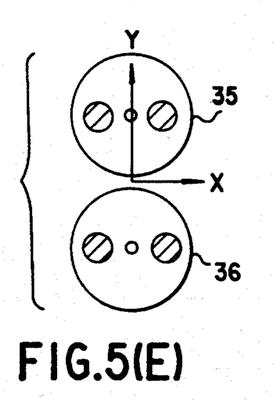
Figure 5F:
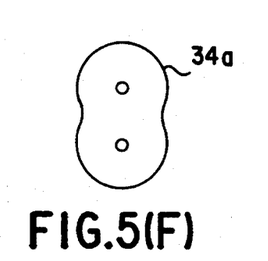

In the second embodiment, non-polarization fibers 31, 32 of a single mode are arranged so that they come into contact to each other at the side surfaces thereof and then they are partially heated and fused by an oxyhydrogen burner 33 from the side surfaces thereof to form a fused portion 34a. Note, in the figure, numeral 31a designates the core of the non-polarization fiber 31 and numeral 31b designates the clad thereof, and numeral 32a designates the core of the non-polarization fiber 32 and numeral 32b designates the clad thereof.

In this heating operation, a heating temperature and time are controlled so that the aspect ratio b/a of the cross section of the fused portion 34a is 1.85–1.95. Thereafter, the fused portion 34a is drawn in the axial direction of the respective non-polarization fibers 31, 32 while lowering the heating temperature to keep the aspect ratio unchanged.

At this time, an optical power $P_0$ is input from the light incident end A of the non-polarization fiber 31, an optical power $P_2$ output from the light emitting end C of the non-polarization fiber 32 is monitored, and then the heating and drawing operation is stopped when a degree of coupling $P_2/P_0$ reaches 100%. In this way, the fused/drawn portion 34a with a wide wavelength region $\Delta\lambda$ can be obtained by which a simple separation or coupling can be executed.

Next, the thus obtained fused/drawn portion 34a is fixedly bonded to a quartz substrate together with the non-polarization fibers 31 and 32 and thereafter the non-polarization fibers 31, 32 are cut at a desired vicinity of the fused/drawn portion 34a and polarization-maintaining fibers (e.g., PANDA fibers) 35, 36, 37, 38 are connected to the cut non-polarization fibers 31, 32, respectively after they have been adjusted by axial rotation so that the X-, Y-planes of polarization thereof face to the same direction. The non-polarization fibers are fixedly connected to the polarization-maintaining fibers by abutting the former against the latter in two V-shaped grooves arranged in parallel so that they can be connected to each other even if the non-polarization fibers 31, 32 have a short length. They may be fixed by a method of a laser beam fusing or the like.

Figure 5G:
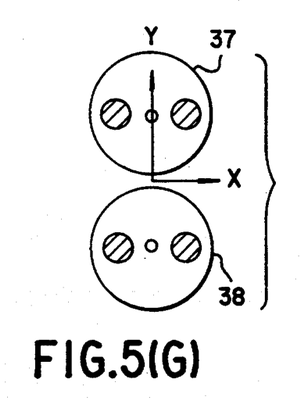

In this way, a polarization-splitting fiber coupler 34 is compose of the fused/drawn portion 34a, non-polarization fibers 32 and polarization-maintaining fibers 35, 36, 37 and 38.

In the second embodiment, a polarization keeping function can be easily provided with the fused/drawn portion 34a based on the non-polarization fibers 31, 32 by connecting the polarization-maintaining fibers 35, 36, 37, 38, and further since the non-polarization fibers 31, 32 have a short length L2 (e.g., the fused/drawn portion 34a has a length L1 of 20–30 mm and the length L2 is within 100 mm), the polarization state at the fused/drawn portion 34a can be stabilized and thus a polarization separation/coupling can be stably executed.

FIGS. 6(A)–(G) are diagrams explaining a method of manufacturing a polarization-splitting fiber coupler of a third embodiment.

In the third embodiment, short (about 20–30 mm) non-polarization fibers 43, 44 with a single mode are previously spliced to the intermediate portions of polarization-maintaining fibers (e.g., PANDA fibers) 41, 42 and they are arranged, respectively after they have been adjusted by axial rotation so that the X-, Y-planes of polarization thereof face to the same direction, and then the non-polarization fibers 43, 44 are heated and fused from the side surfaces thereof by an oxyhydrogen burner 45 to form a fused portion 46a. In this heating operation, a heating temperature and time are controlled so that the aspect ratio b/a of the cross section of the fused portion 46a is 1.85–1.95. Thereafter, the fused portion 46a is drawn in the axial direction of the respective non-polarization fibers 43, 44 while lowering the heating temperature to keep the aspect ratio unchanged. At this time, an optical power is monitored at a light emitting end and the heating and drawing operation is stopped when a degree of coupling reaches 100%, in the same way as the first embodiment.

Figure 6A:
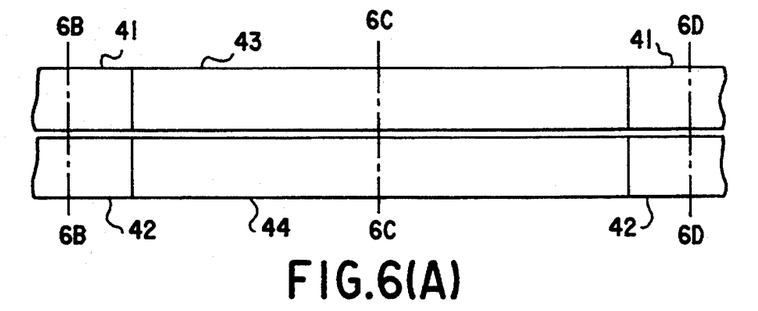
FIGS. 6(A)–(D) are diagrams explaining the fiber connection in a method of manufacturing a polarization-splitting fiber coupler of a third embodiment.
Figure 6B:
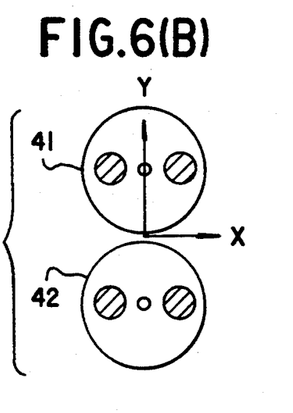
Figure 6C:
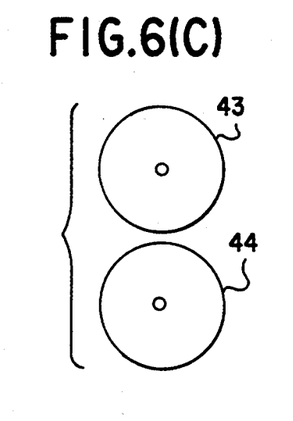
Figure 6D:
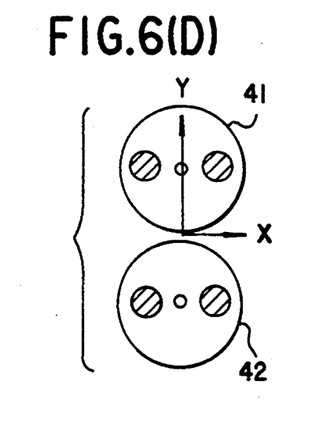
Figure 6E:
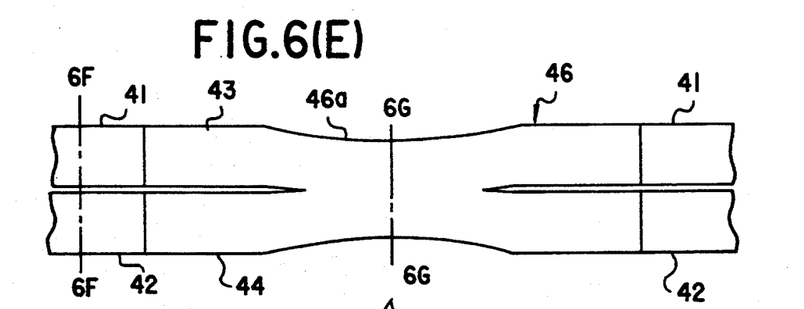
FIGS. 6(F)–(G) are diagrams explaining the fusing and drawing in the method of manufacturing the polarization-splitting fiber coupler of the third embodiment.
Figure 6F:
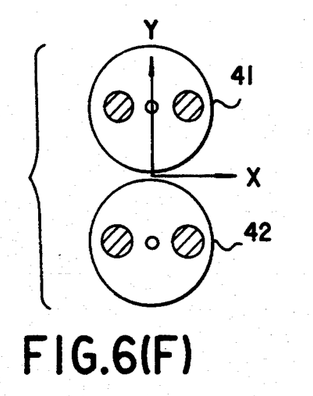
Figure 6G:
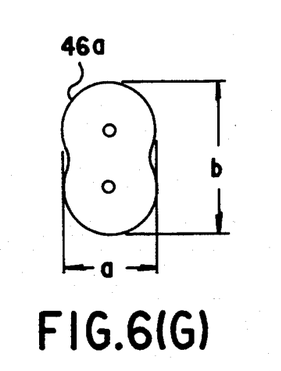

In this way, a polarization-splitting fiber coupler 46 is composed of the polarization-maintaining fibers 43, 44, non-polarization fibers 41, 42 and fused/drawn portion 46a.

The plane of polarization of the third embodiment can be more easily adjusted as compared with that of the second embodiment, and thus a polarization separation/coupling can be more stably executed.

The polarization-splitting fiber couplers 34, 46 made by the second and third embodiments described above have an inserting loss of 0.2 dB or less which is considerably smaller than the inserting loss of about 0.7 dB or higher of the conventional polarization-splitting fiber coupler 1. Further, they have a degree of polarization separation of 12 dB or higher. In addition, when the plane of polarization of a light incident on the polarization-splitting fiber couplers 34, 46 is varied, the variation of loss thereof is 0.2 dB or less.

Note, a polarization selecting property may be also provided with a portion on the light emitting end side of the polarization-maintaining fibers of the second and third embodiments in the same way as the first embodiment in such a manner that the portion is drawn to a taper-shape to be added with a polarizer function while the portion is heated by an oxyhydrogen burner. With this arrangement, the degree of polarization separation/coupling of the polarization-splitting fiber coupler can be easily improved.

As described above, according to the present invention, a polarization-splitting fiber coupler with a wide wavelength region and high degree of polarization separation can be provided by which a polarization separation/coupling can be stably executed and further the polarization-splitting fiber coupler can be made at a low cost. Further, since the polarization-splitting fiber coupler is a fused-type, it has a small inserting loss, and since polarization separation/coupling characteristics are stabilized by forming a fused/drawn portion by using polarization-maintaining fibers and a plane of polarization need not be adjusted by forming a fused/drawn portion by using non-polarization fibers, a yield can be improved in production.

The forgoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be restored to, falling within the scope of the invention in the appended claims and their equivalents.

What is claimed is:

1. A method of manufacturing a polarization-splitting fiber coupler, comprising the steps of:
   (1) arranging a plurality of non-polarization fibers in parallel so that the side surfaces thereof come into contact to each other;
   (2) heating and fusing a portion of said arranged non-polarization fibers by controlling a heating temperature and time so that the cross section of the fused portion thereof has an aspect ratio of 1.85–1.95;
   (3) thereafter, forming a fused/drawn portion by drawing said fused portion while keeping the aspect ratio after Lowering the heating temperature; and
   (4) connecting polarization-maintaining fibers to the respective ends of said fused/drawn portion, respectively.

2. A method of manufacturing a polarization-splitting coupler according to claim 1, further comprising the step (5) of heating and drawing a portion of said connected polarization-maintaining fiber to a taper shape to provide said heated/fused portion with a polarizer function.

3. A method of manufacturing a polarization-splitting fiber coupler, comprising the steps of:
   (1) connecting polarization-maintaining fibers to the respective ends of a plurality of non-polarization fibers;
   (2) arranging said non-polarization fibers of said plurality of the fibers obtained at step in parallel so that the side surfaces thereof come into contact to each other;
   (3) heating and fusing a portion of said arranged non-polarization fibers by controlling a heating temperature and time so that the cross section of the fused portion thereof has an aspect ratio of 1.85–1.95; and
   (4) thereafter, forming a fused/drawn portion by drawing said fused portion while keeping the aspect ratio after lowering the heating temperature.

4. A method of manufacturing a polarization-splitting fiber coupler according to claim 3, further comprising the step (5) of heating and drawing a portion of said polarization-maintaining fiber connected at step (1) to a taper shape to provide said heated-fused portion with a polarizer function.

5. A polarization-splitting fiber coupler, comprising:
   a plurality of polarization-maintaining fibers arranged in parallel so that the side surfaces thereof come into contact to each other, said polarization-maintaining fibers having a portion heated and fused by controlling a heating temperature and time so that the cross section of the fused portion has an aspect ratio of 1.85–1.95 and thereafter drawn in the axial direction thereof while keeping the aspect ratio after lowering the heating temperature and formed to a fused/drawn portion; and plurality of polarization-maintaining fibers connected to the respective ends of the plurality of said non-polarization fibers, respectively.

6. A polarization-splitting fiber coupler according to claim 5, further comprising a polarizer provided with a portion of said polarization-maintaining fiber and obtained by heating and drawing a portion of said polarization-maintaining fiber to a taper shape.

* * * * *